(12) United States Patent
Sakaguchi et al.

(10) Patent No.: US 11,125,324 B2
(45) Date of Patent: Sep. 21, 2021

(54) SHIFT RANGE CONTROL DEVICE

(71) Applicant: DENSO CORPORATION, Kariya (JP)

(72) Inventors: Kouji Sakaguchi, Kariya (JP); Seiji Nakayama, Kariya (JP); Jun Yamada, Kariya (JP); Haruka Miyano, Kariya (JP)

(73) Assignee: DENSO CORPORATION, Kariya (JP)

( * ) Notice: Subject to any disclaimer, the term of this patent is extended or adjusted under 35 U.S.C. 154(b) by 42 days.

(21) Appl. No.: 16/841,790

(22) Filed: Apr. 7, 2020

(65) Prior Publication Data
US 2020/0325986 A1 Oct. 15, 2020

(30) Foreign Application Priority Data

Apr. 15, 2019 (JP) .............................. JP2019-077077

(51) Int. Cl.
*F16H 61/12* (2010.01)
*F16H 61/32* (2006.01)

(52) U.S. Cl.
CPC ............. *F16H 61/12* (2013.01); *F16H 61/32* (2013.01); *F16H 2061/326* (2013.01)

(58) Field of Classification Search
CPC .... F16H 61/12; F16H 61/32; F16H 2061/326; F16H 2061/1208; F16H 2061/1216; F16H 2061/1288
See application file for complete search history.

(56) References Cited

U.S. PATENT DOCUMENTS

| 2004/0053743 A1* | 3/2004 | Tsuzuki | F16H 59/105 477/97 |
| 2007/0087896 A1* | 4/2007 | Matsuzaki | F16H 61/32 477/107 |
| 2013/0110365 A1* | 5/2013 | Kimura | F16H 61/32 701/65 |
| 2016/0102761 A1* | 4/2016 | Kuwahara | F16H 61/28 74/473.12 |

FOREIGN PATENT DOCUMENTS

JP 2018-179142 11/2018

* cited by examiner

*Primary Examiner* — Edwin A Young
(74) *Attorney, Agent, or Firm* — Nixon & Vanderhye PC

(57) ABSTRACT

A shift range control device includes an angle detector, a valley position learner, and a validity determiner. The angle detector detects a rotation angle of an output shaft of a shift actuator. The valley position learner learns the rotation angle of the output shaft when a locker is positioned at a valley bottom of a recess as a valley position based on a detection angle of the angle detector. The validity determiner determines validity of a learning value of the valley position learner.

7 Claims, 12 Drawing Sheets

SHIFT RANGE CONTROL DEVICE

CROSS REFERENCE TO RELATED APPLICATION

The present application is based on and claims the benefit of priority of Japanese Patent Application No. 2019-077077, filed on Apr. 15, 2019, the disclosure of which is incorporated herein by reference.

TECHNICAL FIELD

The present disclosure generally relates to a shift range control device.

BACKGROUND INFORMATION

A shift range switching mechanism of the automatic transmission has a rotating member and a locking member. When the rotating member rotates, a valve position of a range switching valve of a hydraulic circuit moves. The shift range is switched in accordance with the valve position of the range switching valve. A plurality of recesses corresponding to each of the shift ranges are formed on an outer edge of the rotating member. A locker of the locking member locks the rotation of the rotating member by locking in one of the recesses at a certain rotation position.

A shift actuator is coupled to the rotating member so as to be able to transmit rotation. The shift actuator is controlled by the shift range control device. The shift range control device grasps a current shift range based on an output signal of a rotation angle sensor provided on an output shaft of the shift actuator, and switches the shift range to a target shift range. For example, in the related art, the shift range control device determines that the locker has moved to a valley bottom of the recess based on the output signal of the rotation angle sensor, and learns the rotation angle of the output shaft at such time as a rotation angle when the locker is positioned at the valley bottom (hereinafter, designated as a valley position).

SUMMARY

It is an object of the present disclosure is to provide a shift range control device capable of improving the reliability of valley position learning.

BRIEF DESCRIPTION OF THE DRAWINGS

Objects, features, and advantages of the present disclosure will become more apparent from the following detailed description made with reference to the accompanying drawings, in which.

DETAILED DESCRIPTION

Figure 1:
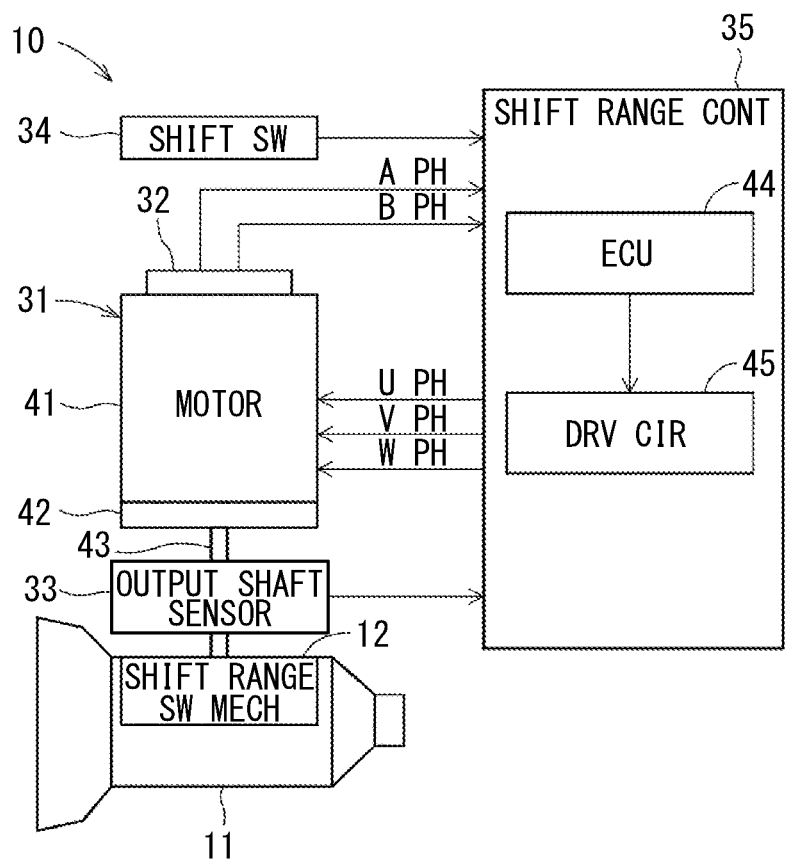
FIG. 1 is a diagram illustrating a shift-by-wire system to which a shift range control device according to a first embodiment is applied.

The inventor of the present application believes that it is extremely important to improve the reliability of valley position learning, that is, to increase the determination accuracy when determining that the locker is positioned at the bottom of the valley. If the valley position learning is unreliable, incorrect shift range switching and reduced rotational positioning accuracy of the rotating member occur when switching a shift range, while also causing misdetermination and reduction of determination accuracy of the shift range in determining the shift range.

In an example embodiment described below, a shift range control device is devised to be capable of improving the reliability of valley position learning.

The following are examples of factors that cause valley position learning to fail.

(1) The locker is unlikely to fall down to the bottom of the recess due to the increase in friction in a low temperature environment.

(2) Noise rides on (a signal of) the rotation angle sensor of the output shaft.

(3) When the output shaft is positioned at the valley position ahead of the motor (i.e., before the motor rotates to a target position) due to a play of a rotation transmission system from the motor to the output shaft, the output shaft bounces within a range of the play thereby jeopardize the learning.

The inventor thought that it was necessary to detect failure of valley position learning due to the above-described factors.

A shift range control device according to one aspect of the present disclosure is applied to a shift range switching mechanism, which includes a rotating member that is rotatably connected to a shift actuator and has a plurality of recesses, and a locking member that determines or locks a rotation position of the rotating member by locking in the recesses, and controls the shift actuator to switch a shift range. The shift range control device includes an angle detector, a valley position learner, and a validity determination unit. The angle detector detects a rotation angle of an output shaft of the shift actuator. The valley position learner learns, based on a detection value of the angle detector, a rotation angle of the output shaft when the locking member is positioned at the bottom of the recess as a valley position. The validity determination unit determines validity of a learning value obtained by the valley position learner.

Thus, by determining validity of the learning value of the valley position, a failure of valley position learning can be detected. By detecting a failure of valley position learning, the valley position learning is reliably performable, thereby suppressing erroneous shift range switching and erroneous determination of the shift range.

Hereinafter, a plurality of embodiments of a shift range control device is described with reference to the drawings. In the plurality of embodiments, substantially identical parts bear identical reference numbers thereby not to repeat the same description thereof.

First Embodiment

A shift range control device according to a first embodiment is applied to a shift-by-wire system of a vehicle. As shown in FIG. 1, a shift-by-wire system 10 is a system that electrically controls a shift range switching mechanism 12 of an automatic transmission 11.

<Shift Range Switching Mechanism>

Figure 2:
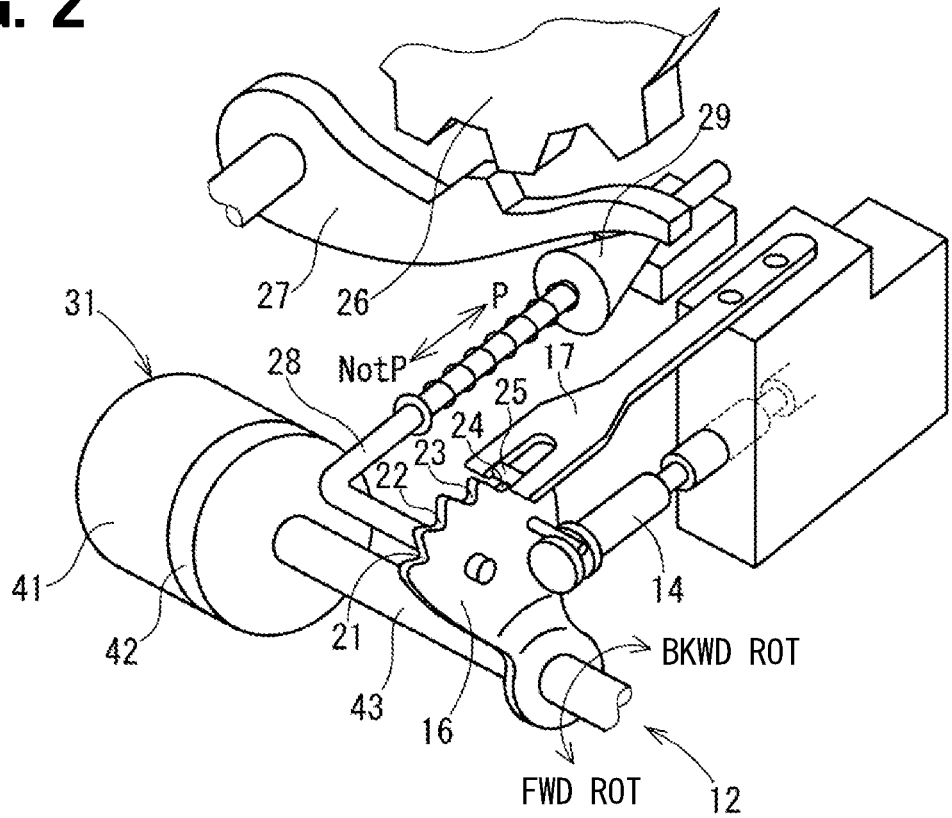
FIG. 2 is a perspective view of a shift range switching mechanism of FIG. 1.

The shift range switching mechanism 12 is described with reference to FIG. 2. The shift range switching mechanism 12 includes a detent plate 16 and a detent spring 17. The detent plate 16 changes a valve position of a range switching valve 14 of a transmission hydraulic circuit according to its rotational position. The shift range is switched in accordance with the valve position of the range switching valve 14. On an outer edge of the detent plate 16, a plurality of recesses 21 to 24 corresponding to the respective shift ranges are formed.

A pressing force by the detent spring 17 presses the detent spring 17 to the detent plate 16. A locker 25 of the detent spring 17 locks a rotation position of the detent plate 16 by engaging with one of the recesses 21 to 24. The recesses 21 to 24 and the detent spring 17 constitute a positioner of the detent plate 16. The locker 25 can make a relative move between the recesses 21 to 24 when the detent spring 17 elastically deforms by an application of a rotational force of a predetermined level or more to the detent plate 16. The recesses 21 to 24 correspond respectively to a parking range, a reverse range, a neutral range, and a drive range.

The shift range switching mechanism 12 further includes a park gear 26, a park pole 27, and a park rod 28 as components for providing a parking lock. The park gear 26 integrally rotates with an output shaft of the automatic transmission 11. The park pole 27 moves toward or away from the park gear 26, for locking the rotation of the output shaft of the automatic transmission 11 by engaging with the park gear 26. The park rod 28 is connected to the detent plate 16. When the rotation position of the detent plate 16 is in a position in accordance with the parking range, the park rod 28 pushes a conical body 29 at a tip portion under a lower side of the park pole 27. Thereby, the park pole 27 is pushed up and the park pole 27 and the park gear 26 are engaged with each other.

<Shift-by-Wire System>

The shift-by-wire system 10 is described with reference to FIG. 1. As shown in FIG. 1, the shift-by-wire system 10 includes a shift actuator 31, an encoder 32, an output shaft sensor 33, a shift switch 34, and a shift range control device 35.

The shift actuator 31 corresponds to a rotary electric actuator that outputs rotational power, and includes a motor 41 and a speed reduction gear 42. The speed reduction gear 42 decelerates the rotation of the motor 41, and outputs the rotation of the motor 41 from an output shaft 43. The output shaft 43 is connected to the detent plate 16 (see FIG. 2) of the shift range switching mechanism 12.

The encoder 32 is a sensor that detects a rotation angle of a rotor of the motor 41, and outputs pulse signals of plural phases to the shift range control device 35 in synchronization with the rotation of the rotor.

The output shaft sensor 33 is a sensor that detects the rotation angle of the output shaft 43, and outputs a signal corresponding to the rotation angle of the output shaft 43 to the shift range control device 35. The output signal of the output shaft sensor 33 is used for grasping a current shift range and for calculating a rotation speed of the output shaft 43, or the like.

The shift switch 34 is a switch operated by a driver of the vehicle 10 and outputs a signal corresponding to a request of the shift range from the driver. Hereinafter, the shift range requested by the driver may be appropriately referred to as a "target shift range."

The shift range control device 35 includes an electronic control unit, or an ECU 44 whose main components are a microcomputer and a drive circuit 45 including an inverter that controls energization of plural phase coils of the motor 41. The ECU 44 outputs an instruction signal for driving the motor 41 in accordance with the output signals from the encoder 32, the output shaft sensor 33, the shift switch 34, and a vehicle speed sensor or the like (not shown). The drive circuit 45 switches an energization state of each of the phase coils of the motor 41 in accordance with the instruction signal from the ECU 44.

<Function of ECU (1)>

Figure 3:
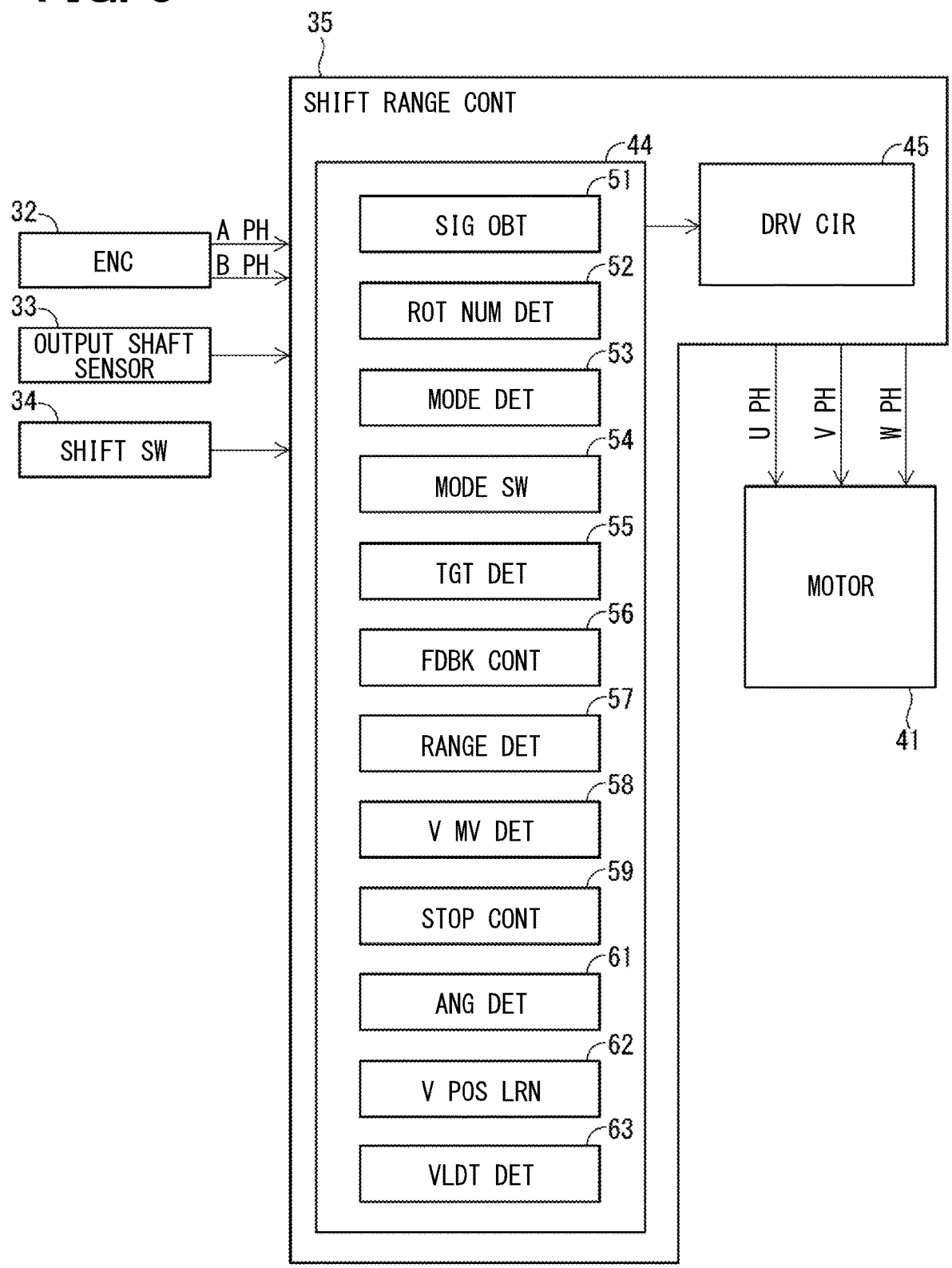
FIG. 3 is a diagram illustrating functional units included in an electronic control unit (ECU) of the shift range control device of FIG. 1.

The ECU 44 of the shift range control device 35 is described with reference to FIG. 3. First, a shift range switching function of the ECU 44 is described. The ECU 44 includes a signal obtainer 51 that obtains the output signal of each sensor, and a rotation speed detector 52. The rotation speed detector 52 detects a rotation number of the output shaft 43 (i.e., hereinafter referred to as an output shaft rotation number No) based on the output signal of the output shaft sensor 33, and detects a rotation number of the motor 41 based on the output signal of the encoder 32 (i.e., hereinafter referred to as a motor rotation number Nm).

A drive mode of the motor 41 controlled by the ECU 44 includes a standby mode, a feedback control mode, and a stop control mode. The ECU 44 includes a mode determiner 53 that determines which one of the modes described above is currently set, and a mode switcher 54 that switches the drive mode. The drive mode is set to the standby mode when the ECU 44 is initialized.

The ECU 44 includes a target determiner 55 as the functional unit in accordance with the standby mode. The target determiner 55 determines whether or not a target shift range has been changed from the current shift range based on the output signal of the shift switch 34. The mode switcher 54 switches the drive mode to the feedback control mode when the target shift range is changed from the current shift range.

The ECU 44 includes a feedback controller 56, a range determiner 57, and a valley move determiner 58 as functional units corresponding to the feedback control mode. The feedback controller 56 sets a target angle of the motor 41 corresponding to the target shift range, and rotates the motor 41 by feedback control based on the encoder count value and the motor rotation speed.

The range determiner 57 determines where the output shaft 43 is positioned among a plurality of range determination scopes based on the output signal of the output shaft sensor 33. The range determination scopes include a P range determination scope, a R range determination scope, a N range determination scope, and a D range determination scope. The P range determination scope is set to a range where the locker 25 is positioned in the recess 21. The R range determination scope is set to a range where the locker 25 is positioned in the recess 22. The N range determination scope is set to a range where the locker 25 is positioned in the recess 23. The D range determination scope is set to a range where the locker 25 is positioned in the recess 24.

Hereinafter, the range determination scope determined to be where the output shaft 43 is positioned may be referred to as a "current range determination scope." Further, a range determination scope in which the target shift range is established is referred to as a "target range determination scope."

Based on the change in the output shaft rotation number No during the shift range switching, the valley move determiner 58 determines that the locker 25 has made a relative move to a bottom of a recess (i.e., may also be referred to as a valley bottom) corresponding to the current range determination scope among the recesses 21 to 24. In the first embodiment, the valley move determiner 58 determines that the locker 25 has made a relative move to the valley bottom of a recess when the output shaft rotation number No becomes a predetermined value N1 or less during the shift range switching.

If the current range determination scope matches the target range determination scope and the output shaft rotation number No becomes equal to or less than the predetermined value N1 during the shift range switching, the valley move determiner 58 determines that the locker 25 has moved to the valley bottom of one of the recesses 21 to 24 corresponding to the target range determination scope. That is, in the above-described case, the valley move determiner 58 determines that the locker 25 has moved to the valley bottom of a recess corresponding to the target shift range. The mode switcher 54 switches the drive mode to the stop control mode when it is determined that the locker 25 has moved to the bottom of a recess corresponding to the target shift range.

The ECU 44 includes a stop controller 58 as the functional unit in accordance with the stop control mode. While stopping the rotation of the motor 41, the stop controller 58 determines whether the rotation stop is complete.

The rotation of the detent plate 16 and the output shaft 43 during the shift range switching is described in the following. During the shift range switching, the locker 25 accelerates, for example, to roll down, toward the valley bottom of a recess after passing an apex between the two recesses. As the result, the rotation number of the detent plate 16 and the output shaft 43 significantly increase compared to the rotation number of the motor 41. Therefore, at a time of when the locker 25 moves to the valley bottom of a recess corresponding to the target shift range, the rotation of the detent plate 16 and the output shaft 43, which positions the locker 25 at the valley bottom of a recess, precedes the rotation of the rotor of the motor 41 by an amount of play in the rotation transmission system from the rotor of the motor 41 to the output shaft 43. Therefore, while the play described above is reduced, the detent plate 16 and the output shaft 43 does not rotate even when the motor 41 rotates. The stop controller 59 stops the rotation of the motor 41 after the locker 25 moves to the valley bottom of the recess corresponding to the target shift range until the play is diminished. The mode switcher 54 switches the drive mode to the standby mode when it is determined that the rotation stop of the motor 41 is complete.

<Process Performed by ECU (1)>

Figure 4:
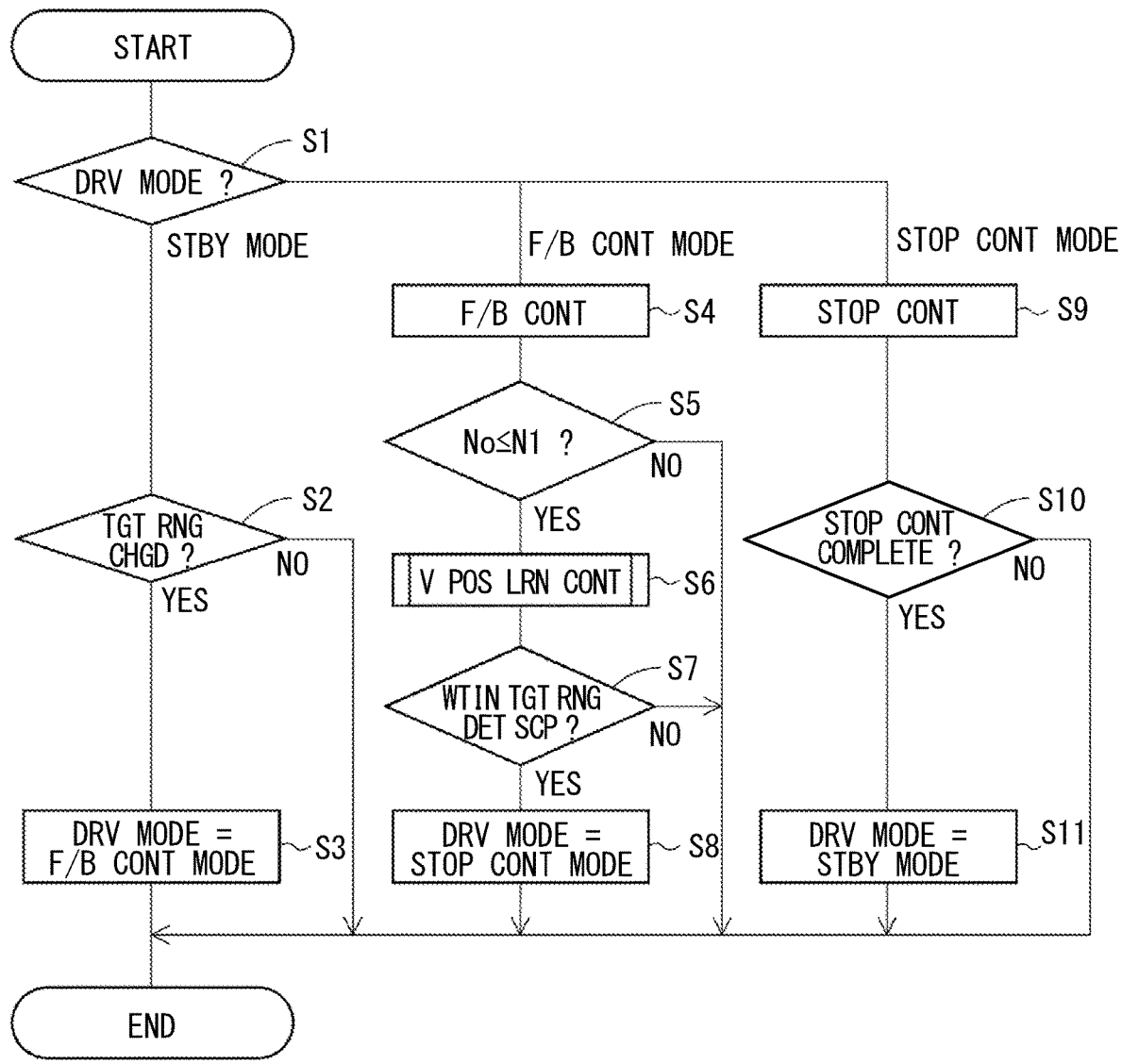
FIG. 4 is a first flowchart illustrating a process performed by the ECU of FIG. 3.

Next, a series of processes performed for the shift range switching by the ECU 44 is described with reference to FIG. 4. A routine shown in FIG. 4 is repeatedly performed after a startup of the ECU 44. In the following description, "S" means a step.

When a routine of FIG. 4 is started, in S1, it is determined which of the standby mode, the feedback control mode, and the stop control mode is currently set as a drive mode. When the drive mode is the standby mode, the process proceeds to S2. When the drive mode is the feedback control mode, the process proceeds to S4. When the drive mode is the stop control mode, the process proceeds to S9.

In S2, it is determined whether the target shift range is changed from the current shift range. When the target shift range is changed (S2: YES), the process proceeds to S3. When the target shift range is not changed (S2: NO), the process exits from the routine of FIG. 4.

In S3, the drive mode is switched to the feedback control mode. After S3, the process exits from the routine of FIG. 4.

In S4, the feedback control is performed. In the feedback control for the first time/cycle, a target angle of the motor 41 is set based on the output signal of the output shaft sensor 33, and the motor 41 is driven to rotate by the feedback control based on the encoder count value and the motor rotation number No. On the other hand, when the feedback control has already been performed, the feedback control is continued. After S4, the process proceeds to S5.

In S5, it is determined whether the output shaft rotation number No is equal to or less than the predetermined value N1. When the output shaft rotation number No is equal to or less than the predetermined value N1 (S5: YES), the process proceeds to S6. When the output shaft rotation number No is not equal to or less than the predetermined value N1 (S5: NO), the process exits from the routine of FIG. 4.

In S6, valley position learning control is performed. Details of the valley position learning control are described later. After S6, the process proceeds to S7.

In S7, it is determined whether the output shaft 43 is positioned in a target range determination scope based on the output signal of the output shaft sensor 33. When the output shaft 43 is positioned in the target range determination scope (S7: YES), the process proceeds to S8. When the output shaft 43 is not positioned in the target range determination scope (S7: NO), the process exits from the routine of FIG. 4.

In S8, the drive mode is switched to the stop control mode. After S8, the process exits from the routine of FIG. 4.

In S9, stop control for stopping the rotation of the motor 41 is performed. After S9, the process proceeds to S10.

In S10, it is determined whether the rotation stop control of the motor 41 is complete. When the stop control is complete (S10: YES), the process proceeds to S11. If the stop control has not been completed (S10: NO), the process exits from the routine of FIG. 4.

In S11, the drive mode is switched to the standby mode. After S11, the process exits from the routine of FIG. 4.

<Specific Operation Example>

Next, one example of operation performed by the ECU 44 is described with reference to FIG. 5 and FIG. 6. This example is an operation example of when the target shift range is changed to the drive range when the current shift range is the parking range.

Figure 5:
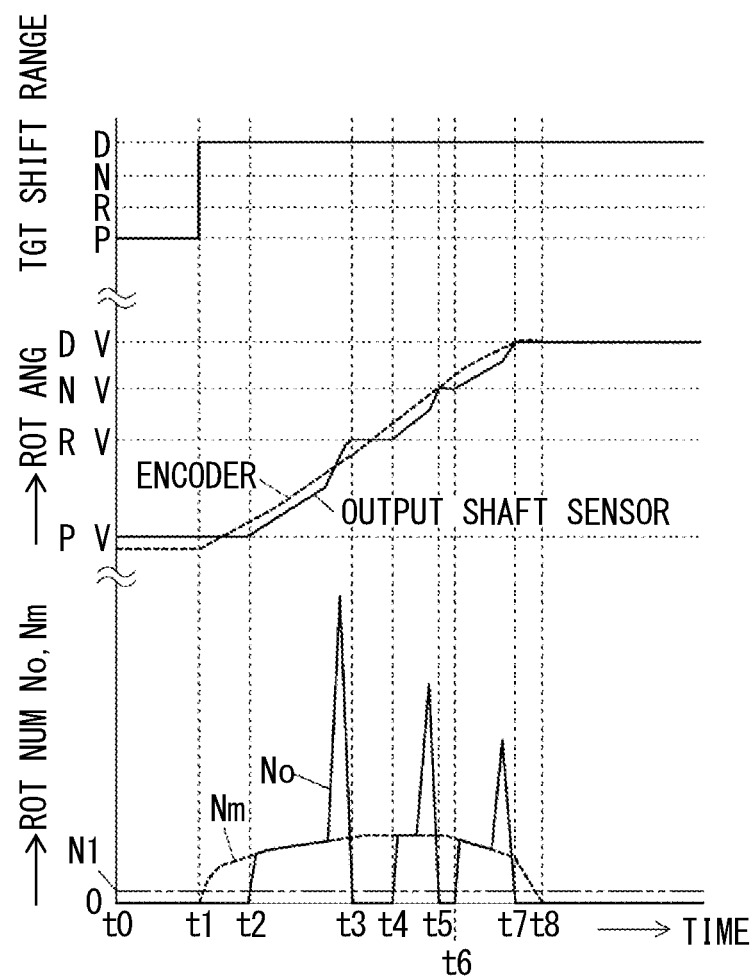
FIG. 5 is a time chart of a rotation angle and a rotation number of an output shaft, a rotation angel and a rotation number of a motor, and a difference of the rotation numbers between the motor and the output shaft when performing a shift range switching by the ECU of FIG. 3.
Figure 6:
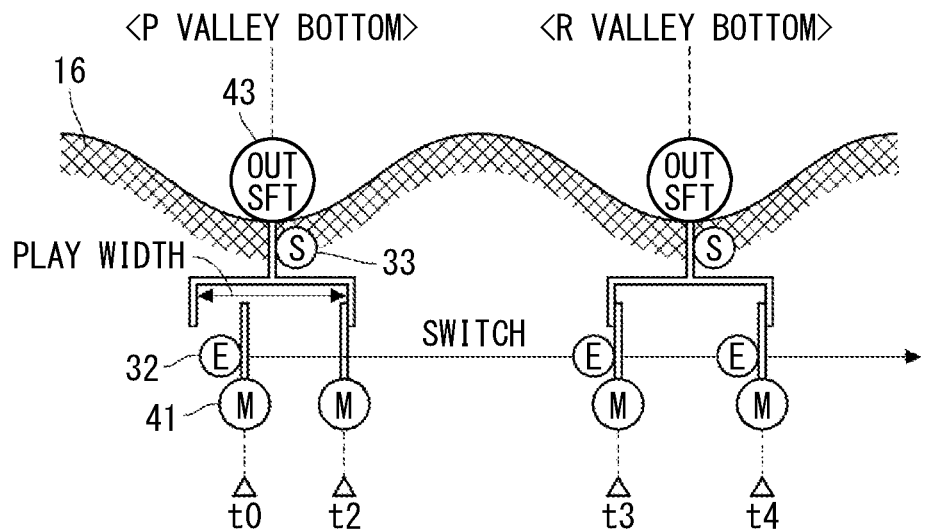
FIG. 6 is a schematic diagram illustrating a play of a rotation transmission system from the motor of the shift actuator of FIG. 1 to the output shaft.

In FIG. 5, the output shaft rotation number No of a vertical axis is described after conversion to the motor rotation number Nm. That is, in FIG. 5, the motor rotation number [Nm] and the output shaft rotation number [No×α] are mutually scaled by a speed reduction ratio α from the motor 41 to the output shaft 43. The value [Nm] and the value [No×α] are shown in an overlapping manner in FIG. 5.

Thereafter, when comparing the output shaft rotation number No and the motor rotation number Nm, it is assumed that the scales of the output shaft rotation number No and the motor rotation number Nm are matched. In such case, the "motor rotation number Nm" and the "output shaft rotation number No" are used, and the description of the speed reduction ratio α is omitted. The sane is applied to the description of the drawings. That is, a term "Nm−No" means a difference between the Nm and the No that are already mutually scaled. Further, "matching the scale with each other" is not limited to a relationship between [Nm] and [No×α], but may also be applicable to a relationship between [Nm÷α] and [No].

In the following description, "P valley bottom (i.e., "P V")", "R valley bottom (i.e., "R V")", "N valley bottom (i.e., "N V")", and "D valley bottom (i.e., "D V")" are valley bottoms of the recesses 21, 22, 23, and 24, respectively shown in FIG. 5.

As shown in FIG. 5, at time t0 before a shift range switching starts, both of the motor rotation number Nm and the output shaft rotation number No are 0. The locker 25 of the detent spring 17 is positioned at the P valley bottom, and the output shaft 43 has a corresponding rotation angle. On the other hand, the rotor of the motor 41 is positioned in a play of the rotation transmission system from the rotor of the motor 41 to the output shaft 43. As shown in FIG. 6, the play is not diminished at time to.

At time t1 of FIG. 5, the target shift range is changed to the drive range, and the switching of the shift range starts. At time t1, the determination of S2 in FIG. 4 is affirmed, and the drive mode is changed to the feedback control mode.

In a period from time t1 to time t2 in FIG. 5, although the motor 41 rotates, the output shaft 43 does not rotate since the play has not yet been diminished.

At time t2 of FIG. 5, the play is diminished. Immediately after time t2, the output shaft 43 starts to rotate. As shown in FIG. 6, the play is diminished at time t2.

The output shaft rotation number No follows the motor rotation number Nm in the first half of the period from t2 to t3 in FIG. 5, that is, before the locker 25 exceeds the apex between the recess 21 and the recess 22.

The detent plate 16 rotates so that the locker 25 falls down to the valley bottom of the recess 22 in the second half of the period from t2 to t3, i.e., after the locker 25 has passed the apex between the recess 21 and the recess 22, and the output shaft rotation number No increases. As a result, the output shaft 43 precedes the motor 41 by an amount of the play.

At time t3 of FIG. 5, the locker 25 moves substantially to the bottom of the R valley, and the output shaft rotation number No falls to be equal to or less than the predetermined value N1. As shown in FIG. 6, at time t3, the output shaft 43 precedes the motor 41 by the amount of play, and moves substantially to the rotation angle corresponding to the bottom of the R valley. At time t3, the determination in S5 of FIG. 4 is affirmed, and valley position learning control is performed thereafter. The current process is for shifting to the drive range, i.e., a target range determination scope is the D range determination scope, and the current range determination scope does not match the target range determination scope. Therefore, the determination of S5 in FIG. 4 is negative.

During a period from time t3 to time t4 in FIG. 5, although the motor 41 rotates, the output shaft 43 does not rotate since the play is not yet diminished.

During a period from time t4 to time t7 in FIG. 5, the operation is the same as the period from time t2 to time t4.

At time t7 in FIG. 5, since the current range determination scope matches the target range determination scope, the determination in S7 in FIG. 4 is affirmed and the drive mode is changed to the stop control mode.

After time t7 of FIG. 5, stop control is performed. Then, at time t8, upon completion of the stop control, the drive mode is changed to the standby mode in S11 of FIG. 4.

<Function of ECU (2)>

Next, s valley position learning function of the ECU 44 is described. The valley position is a rotation angle of the output shaft 43 when the locker 25 is positioned at the bottom of one of the recesses 21 to 24.

The ECU 44 includes an angle detector 61, a valley position learner 62, and a validity determiner 63. The angle detector 61 detects a rotation angle of the output shaft 43 (hereinafter, an output shaft rotation angle θo) based on the output signal of the output shaft sensor 33.

The valley position learner 62 learns, based on a detection value of the angle detector 61, the output shaft rotation angle θo when the locker 25 is positioned at the valley bottom of the recess as a valley position. Specifically, when the valley move determiner 58 determines that the locker 25 has made a relative move to the valley bottom of a recess, the valley position learner 62 learns the output shaft rotation angle θo at such time as the valley position.

In the present embodiment, the learning of the valley position by the valley position learner 62 is, for example, performed at a first operation in an assembly factory or the like and when the shift switching operation is performed from one end to the other end through all the range determination scopes, that is, when the shift range is switched from the parking range to the drive range. Learning of the P valley position corresponding to the range determination scope of a start point is performed when switching from one of other ranges to the parking range. The valley position learner 62 learns valley positions for all of the recesses 21 to 24.

The validity determiner 63 determines validity of the learning value obtained by the valley position learner 62 after performing the valley position learning. The validity determiner 63 determines validity of a specific valley position learned by the valley position learner 62 when the position is within a predetermined normal range that centers on a design value of a rotation angle of the output shaft 43 corresponding to a valley bottom of the specific valley position where the locker 25 stops.

Figure 7:
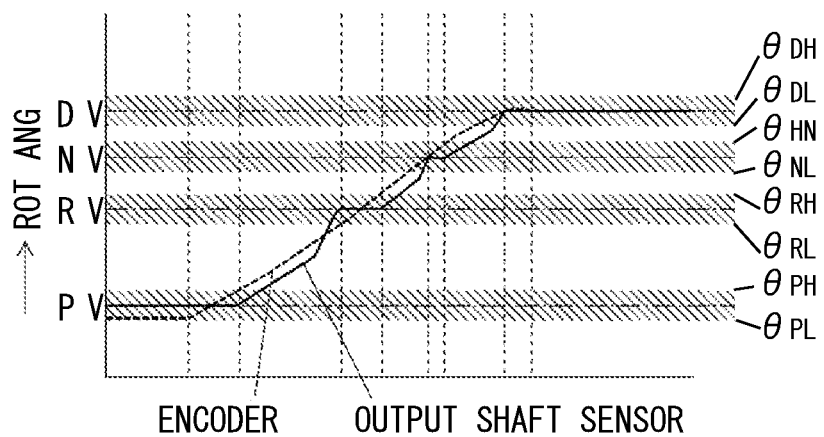
FIG. 7 is a diagram showing a normal range of a valley position in the time chart showing a transition of the rotation angle of the output shaft at the time of shift range switching by the ECU of FIG. 3.

As shown in FIG. 7, if the learned P valley position is within a normal range from θPL to θPH, it is determined that the P valley position is valid. If the learned R valley position is within a normal range from θRL to θRH, it is determined that the R valley position is valid. Further, if the learned N valley position is within a normal range from θNL to θNH, it is determined that the N valley position is valid. If the learned D valley position is within a normal range from θDL to θDH, it is determined that the D valley position is valid.

The respective normal ranges θPL to θPH, θRL to θRH, θNL to θNH, and θDL to θDH are ranges where the P valley bottom, the R valley bottom, the N valley bottom, and the D valley bottom can respectively exist, which are defined as, for example, accumulated ranges of error from each of the relevant components, such as dimensional errors, assembly errors and the like. Among those errors, an angle error for an assembly of the shift actuator 31 to the automatic transmission 11 is dominant.

In the present embodiment, the validity determiner 63 determines the validity of all valley positions learned by the valley position learner 62. The valley position learner 62 completes learning of a valley position when the validity determiner 63 determines that relevant valley position is valid. The valley position regarding which the learning is complete is used for switching the shift range. That is, at the time of shift range switching, the output shaft 43 is rotated toward a learning-complete valley position corresponding to the target shift range. On the other hand, when the validity determining unit 63 determines that the valley position is not valid, the valley position learner 62 does not complete the learning of the valley position, and performs notification of having an abnormal learning state. A valley position regarding which learning has not been complete is not used for the shift range switching.

<Process Performed by ECU (2)>

Next, a series of processes performed by the ECU 44 for the valley position learning is described with reference to FIGS. 4 and 8 to 10.

Figure 8:
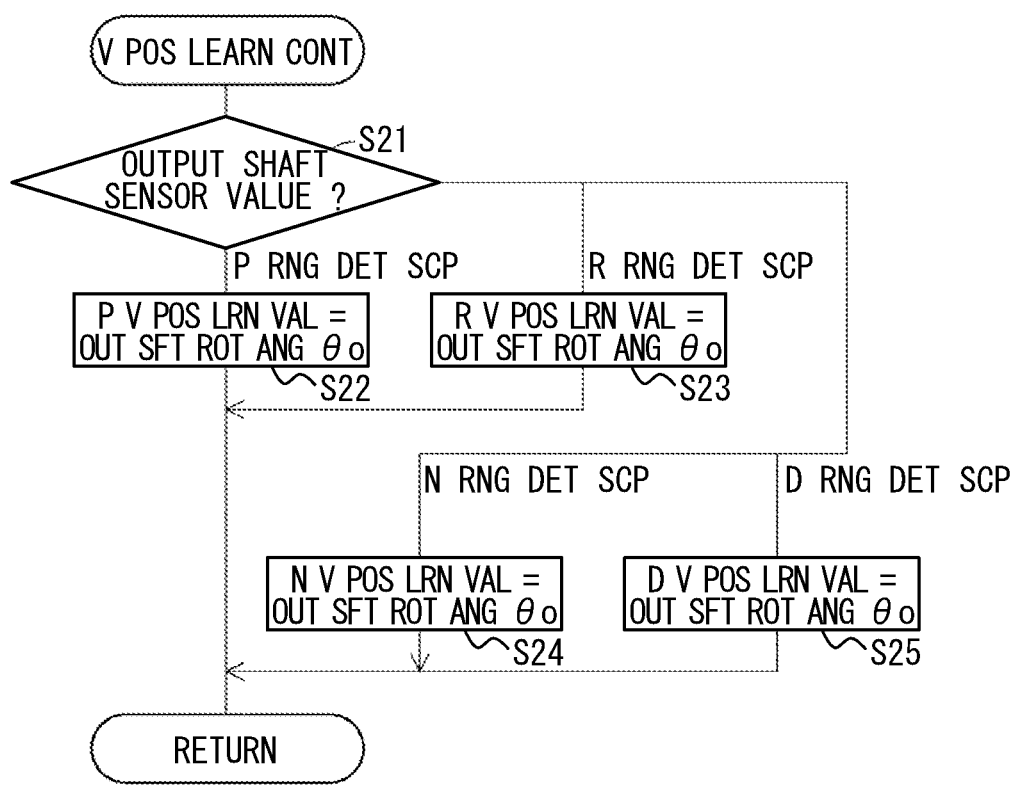
FIG. 8 is a sub-flowchart illustrating a process performed by the ECU of FIG. 3.

In FIG. 4, in S6, a subroutine for a valley position learning control shown in FIG. 8 is called and performed. The process of S6 is performed at the time of the first operation in an assembly factory or the like, for example.

When the subroutine of FIG. 8 is started, it is determined in S21 in which one of the plurality of range determination scopes the output shaft 43 is currently positioned. That is, it is determined which range determination scope is a current range determination scope. If it is the P range determination scope, the process proceeds to S22. If it is the R range determination scope, the process proceeds to S23. If it is the N range determination scope, the process proceeds to S24. If it is the D range determination scope, the process proceeds to S25.

In S22, the current output shaft rotation angle θo is learned as a value of the P valley position. Further, a flag (not shown) indicating that the P valley position learning control has been complete (i.e., hereinafter referred to as a P valley position learning control complete flag) is turned on. After S22, the process returns to the routine of FIG. 4.

In S23, the current output shaft rotation angle θo is learned as a value of the R valley position. Further, a flag (not shown) indicating that the R valley position learning control has been complete (i.e., hereinafter referred to as an R valley position learning control complete flag) is turned on. After S23, the process returns to the routine of FIG. 4.

In S24, the current output shaft rotation angle θo is learned as a value of the N valley position. Further, a flag (not shown) indicating that the N valley position learning control has been complete (i.e., hereinafter referred to as an N valley position learning control complete flag) is turned on. After S24, the process returns to the routine of FIG. 4.

In S25, the current output shaft rotation angle θo is learned as a value of the D valley position. In addition, a flag (not shown) indicating that the D valley position learning control has been complete (i.e., hereinafter referred to as a D valley position learning control complete flag) is turned on. After S25, the process returns to the routine of FIG. 4.

Figure 9:
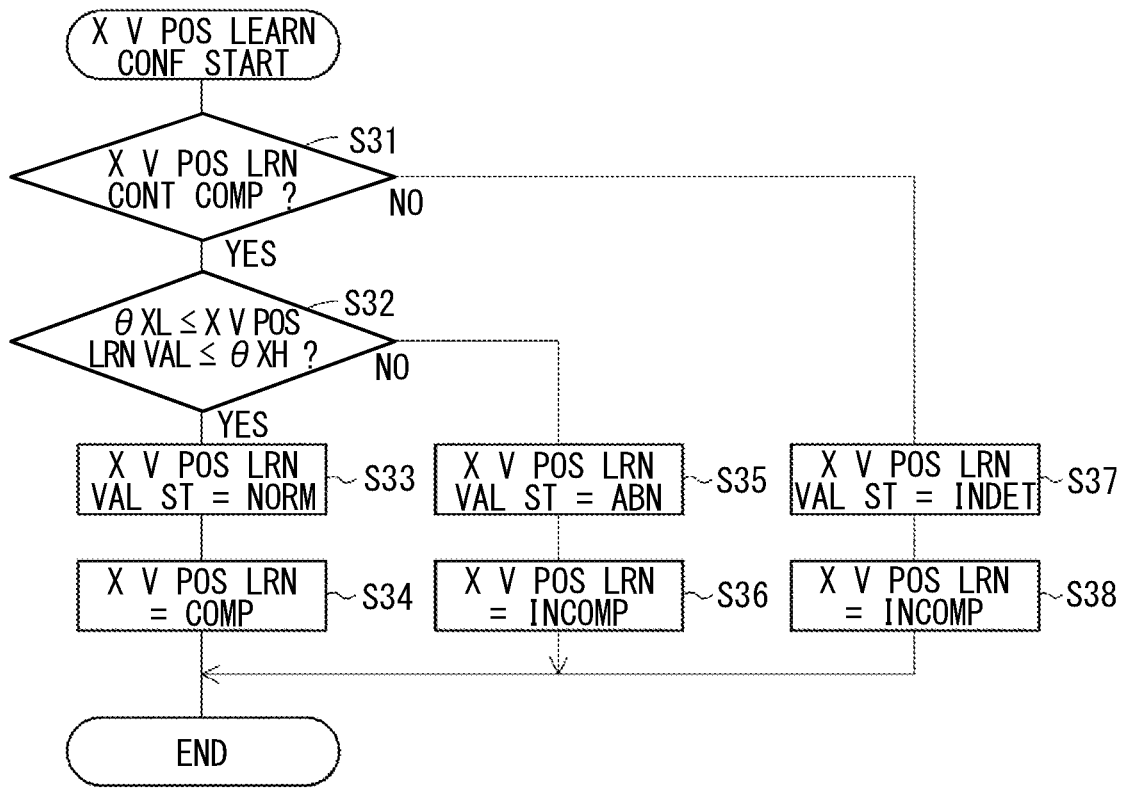
FIG. 9 is a second flowchart illustrating a process performed by the ECU of FIG. 3.

A routine for confirming the valley position learning value shown in FIG. 9 is repeatedly performed after the startup of the ECU 44. In FIG. 9, "X" is appropriately replaced either with "P," "R," "N," or "D." In the following, an example of replacing "X" with "P" is described.

When the routine of FIG. 9 is started, it is determined in S31 whether or not the P valley position learning control complete flag is on. When the P valley position learning control complete flag is on (S31: YES), the process proceeds to S32. When the P valley position learning control complete flag is off (S31: NO), the process proceeds to S37.

In S32, it is determined whether or not the P valley position learning value is within the normal range from θPL to θPH. When the P valley position learning value is within the normal range from θPL to θPH (S32: YES), the process proceeds to S33. If the P valley position learning value is not within the normal range from θPL to θPH (S32: NO), the process proceeds to S35.

In S33, a status of the P valley position learning value is set to "normal." In S34 after S33, the P valley position learning is complete. After S10, the process exits from the routine of FIG. 9.

In S35, a status of the P valley position learning value is set to "abnormal." In S36 after S35, the P valley position learning is set to incomplete. After S10, the process exits from the routine of FIG. 9.

In S37, a status of the P valley position learning value is set to "indeterminable." In S38 after S37, the P valley position learning is set to incomplete. After S10, the process exits from the routine of FIG. 9.

Figure 10:
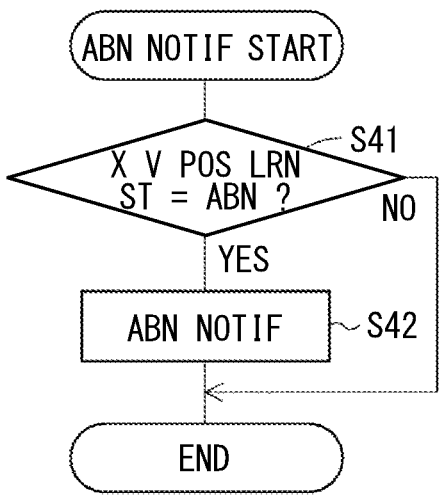
FIG. 10 is a third flowchart illustrating a process performed by the ECU of FIG. 3.

An abnormality notification routine shown in FIG. 10 is repeatedly performed after the startup of the ECU 44. In FIG. 10, "X" is appropriately replaced either with "P," "R," "N," or "D." In the following, an example of replacing "X" with "P" is described.

When the routine of FIG. 10 is started, in S41, it is determined whether or not the status of the P valley position learning value is "abnormal." When the status of the P valley position learning value is "abnormal" (S41: YES), the process proceeds to S42. When the status of the P valley position learning value is not "abnormal" (S41: NO), the process exits the routine of FIG. 10.

In S42, learning of the P valley position is in an abnormal state is notified. This notification is performed, for example, by turning on a lamp of a display device viewed by a factory worker or a vehicle driver. After S42, the process exits from the routine of FIG. 10.

<Effects>

As described above, in the first embodiment, the shift range control device 35 includes the angle detector 61, the valley position learner 62, and the validity determiner 63. The angle detector 61 detects the rotation angle of the output shaft 43 of the shift actuator 31. The valley position learner 62 learns, based on the detection value of the angle detector 61, the rotation angle of the output shaft 43 as the valley position when the locker 25 is positioned at a bottom of one of the recesses 21 to 24. The validity determiner 63 determines validity of the learning value obtained by the valley position learner 62.

Thus, by determining validity of the learning value of the valley position, a failure of valley position learning can be detected. By detecting a failure of valley position learning, the valley position learning is reliably performable, thereby suppressing erroneous shift range switching and erroneous determination of the shift range.

Further, in the first embodiment, the validity determiner 63 determines validity of a specific valley position learned by the valley position learner 62 when the position is within a predetermined normal range that centers on a design value of a rotation angle of the output shaft 43 corresponding to a valley bottom of the specific valley position where the locker 25 stops. In such manner, it is determined whether or not the valley position learning value is within a range of allowable error, for a detection of assembly error/failure and the like.

Further, in the first embodiment, the valley position learner 62 learns the valley positions for each of all the recesses 21 to 24. The validity determiner 63 determines validity of all valley positions learned by the valley position learner 62. In such manner, the accuracy of the valley position learning value can be improved.

Further, in the first embodiment, when the valley position is determined as not valid by the validity determiner 63, the valley position learner 62 does not complete the valley position learning, and performs notification of having the abnormal learning state. In such manner, performing the shift range switching in a not-yet-learned state is preventable.

Second Embodiment

Figure 11:
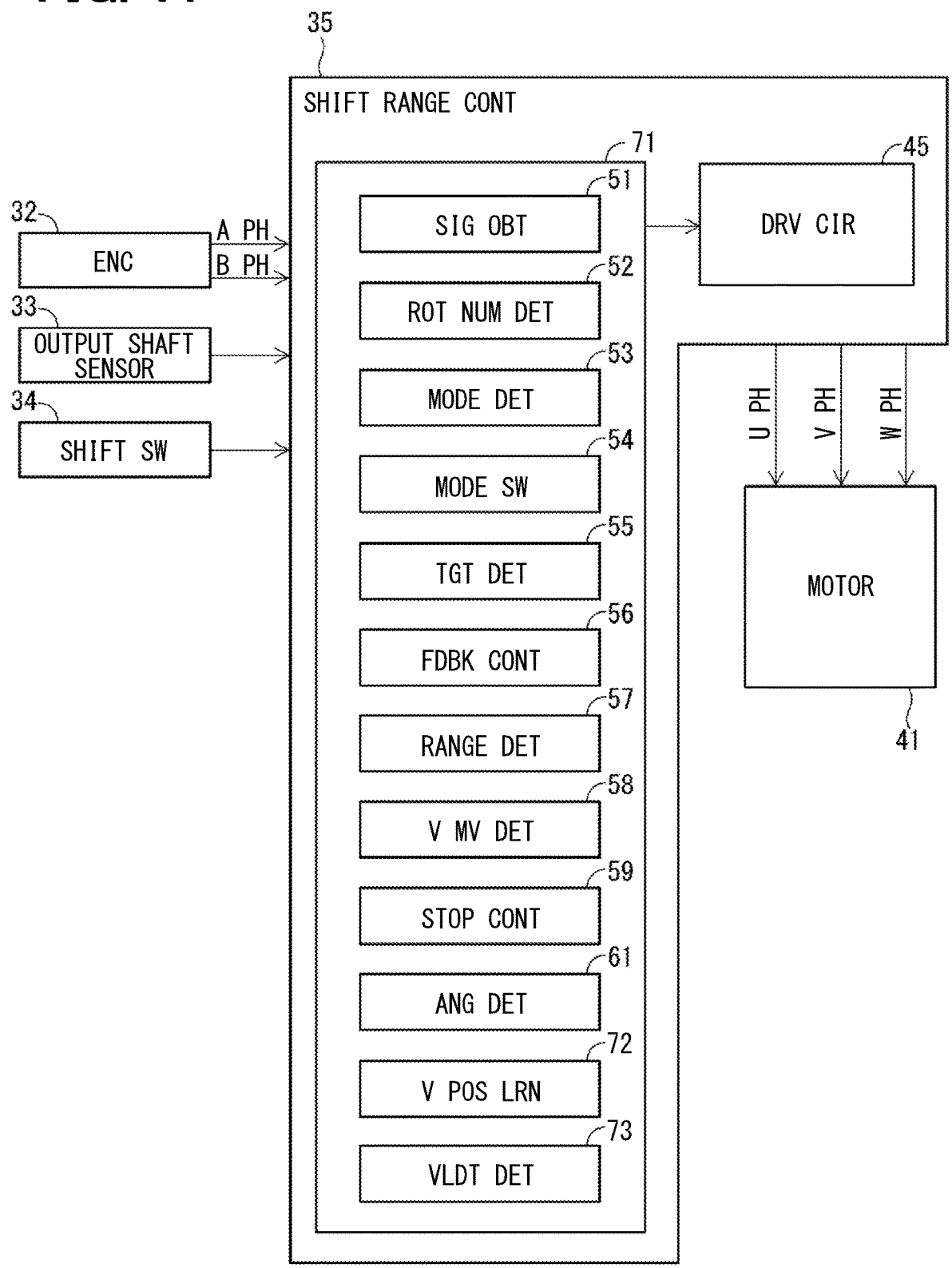
FIG. 11 is a diagram illustrating functional units included in the ECU of the shift range control device of a second embodiment.

In the second embodiment, as shown in FIG. 11, a valley position learner 72 of an ECU 71 learns part of the valley positions of all the recesses 21 to 24. The "part of" mentioned above means, for example, the recess 21 and the recess 23. The valley position learner 72 learns a specific pair of valley positions, i.e., the P valley position and the N valley position.

A validity determiner 73 determines validity of both of the P valley position and the N valley position, which are part of the valley positions. More specifically, the validity determiner 73 affirmatively determines validity of the P valley position and validity of the N valley position when a difference between the P valley position and the N valley position learned by the valley position learner 72 is within a predetermined normal range from $\Delta\theta PNL$ to $\Delta\theta PNH$, which centers on a difference between a design value of the rotation angle of the output shaft 43 when the locker 25 is positioned at the bottom of the P valley and a design value of the rotation angle of the output shaft 43 when the locker 25 is positioned at the bottom of the N valley. The valley position learner 72 completes the learning of the valley position when the validity determiner 73 determines that the P valley position and the N valley position are valid.

Figure 12:
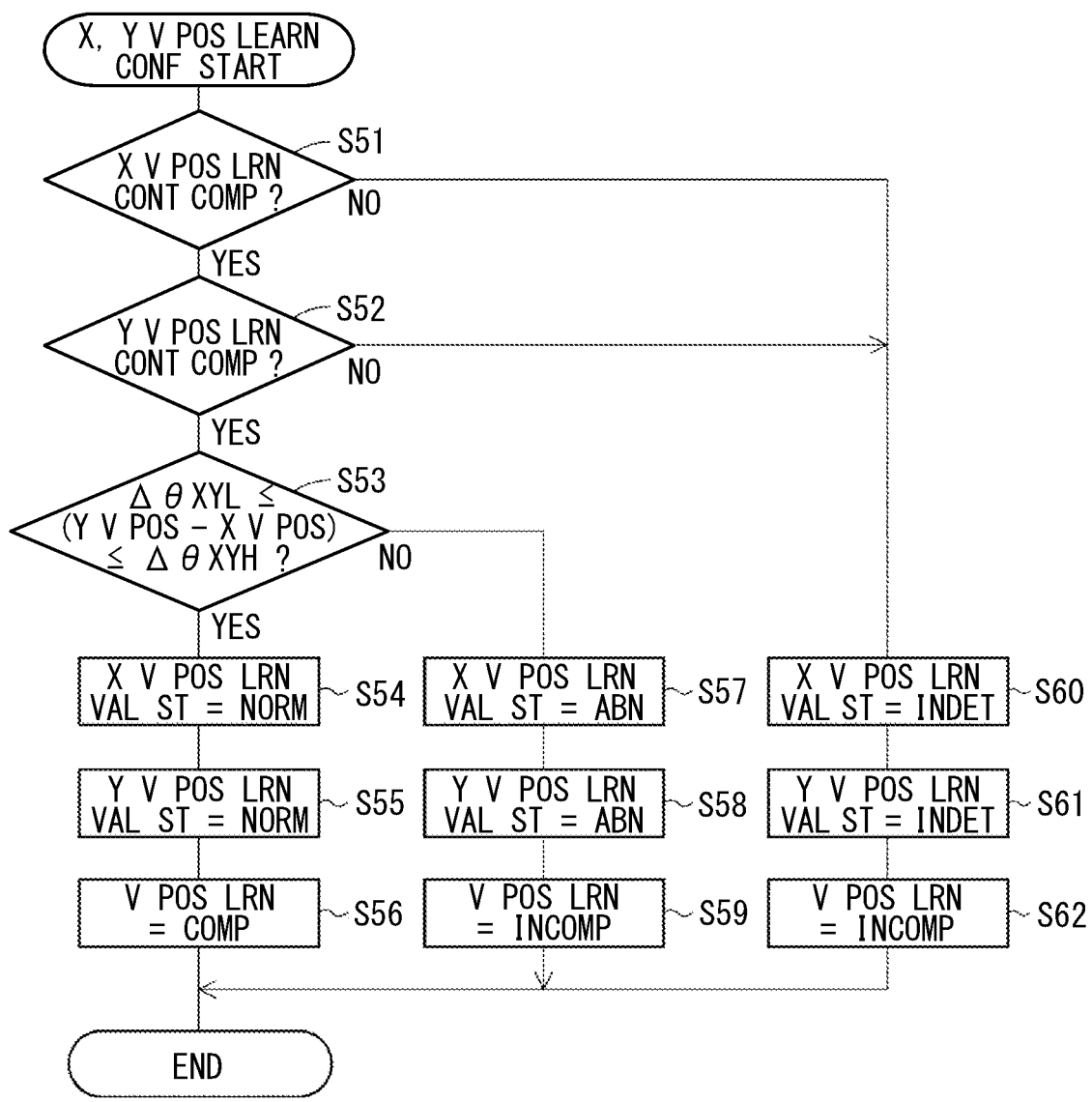
FIG. 12 is a flowchart illustrating a process performed by the ECU of FIG. 11.

The routine for confirming the valley position learning value shown in FIG. 12 is repeatedly performed after the startup of the ECU 71. In FIG. 12, "X" and "Y" are appropriately replaced with two of "P," "R," "N," or "D." In the following, an example of replacement where "X" is replaced with "P" and "Y" is replaced with "N" is described.

When the routine of FIG. 12 is started, it is determined in S51 whether or not the P valley position learning control complete flag is on. When the P valley position learning control complete flag is on (S51: YES), the process proceeds to S52. When the P valley position learning control complete flag is off (S51: NO), the process proceeds to S60.

In S52, it is determined whether or not the N valley position learning control complete flag is on. When the N valley position learning control complete flag is on (S52: YES), the process proceeds to S53. When the N valley position learning control complete flag is off (S52: NO), the process proceeds to S60.

In S53, it is determined whether or not "P valley position learning value−N valley position learning value" is within a normal range from $\Delta\theta PNL$ to $\Delta\theta PNH$. When it is within the normal range from $\Delta\theta PNL$ to $\Delta\theta PNH$ (S53: YES), the process proceeds to S54. When it is not within the normal range from $\Delta\theta PNL$ to $\Delta\theta PNH$ (S53: NO), the process proceeds to S57.

In S54, a status of the P valley position learning value is set to "normal." In S55 after S54, a status of the N valley position learning value is set to "normal." In S56 after S55, the valley position learning is complete. After S10, the process exits from the routine of FIG. 12.

In S57, a status of the P valley position learning value is set to "abnormal." In S58 after S57, a status of the N valley position learning value is set to "abnormal." In S59 after S58, valley position learning is incomplete. After S59, the process exits from the routine of FIG. 12.

In S60, a status of the P valley position learning value is set to "indeterminable." In S61 after S60, a status of the N valley position learning value is set to "indeterminable." In S62 after S61, valley position learning is incomplete. After S62, the process exits from the routine of FIG. 12.

<Effects>

As described above, in the second embodiment, the valley position learner 72 learns a plurality of valley positions. The validity determiner 73 determines validity of the P valley position and validity of the N valley position when a difference between the P valley position and the N valley position learned by the valley position learner 72 is within a predetermined normal range from $\Delta\theta PNL$ to $\Delta\theta PNH$, which centers on a difference between a design value of the rotation angle of the output shaft 43 when the locker 25 is positioned at the bottom of the P valley and a design value of the rotation angle of the output shaft 43 when the locker 25 is positioned at the bottom of the N valley. The normal range from $\Delta\theta PNL$ to $\Delta\theta PNH$ is not affected by an angle error in an assembly of the shift actuator 31 onto the automatic transmission 11. That is, when a first difference between the P valley position and the N valley position is within a certain range from $\Delta\theta PNL$ to $\Delta\theta PNH$ centered on of a second difference between two design values of rotation angles regarding the P valley and the N valley, the validity determiner 73 affirms both of validity of the P valley position and validity of the N valley position. Therefore, since the normal range from $\Delta\theta PNL$ to $\Delta\theta PNH$ is smaller than the normal range of the first embodiment, validity of the valley position learning value can be determined with high accuracy. Therefore, the reliability of valley position learning can be further improved, and erroneous shift range switching and erroneous determination of the shift range can be further suppressed.

In the second embodiment, the valley position learner 72 learns part of the valley positions of all the recesses 21 to 24. The validity determiner 73 determines validity of part of the valley positions. Therefore, time required for the valley position learning is reducible.

Third Embodiment

Figure 13:
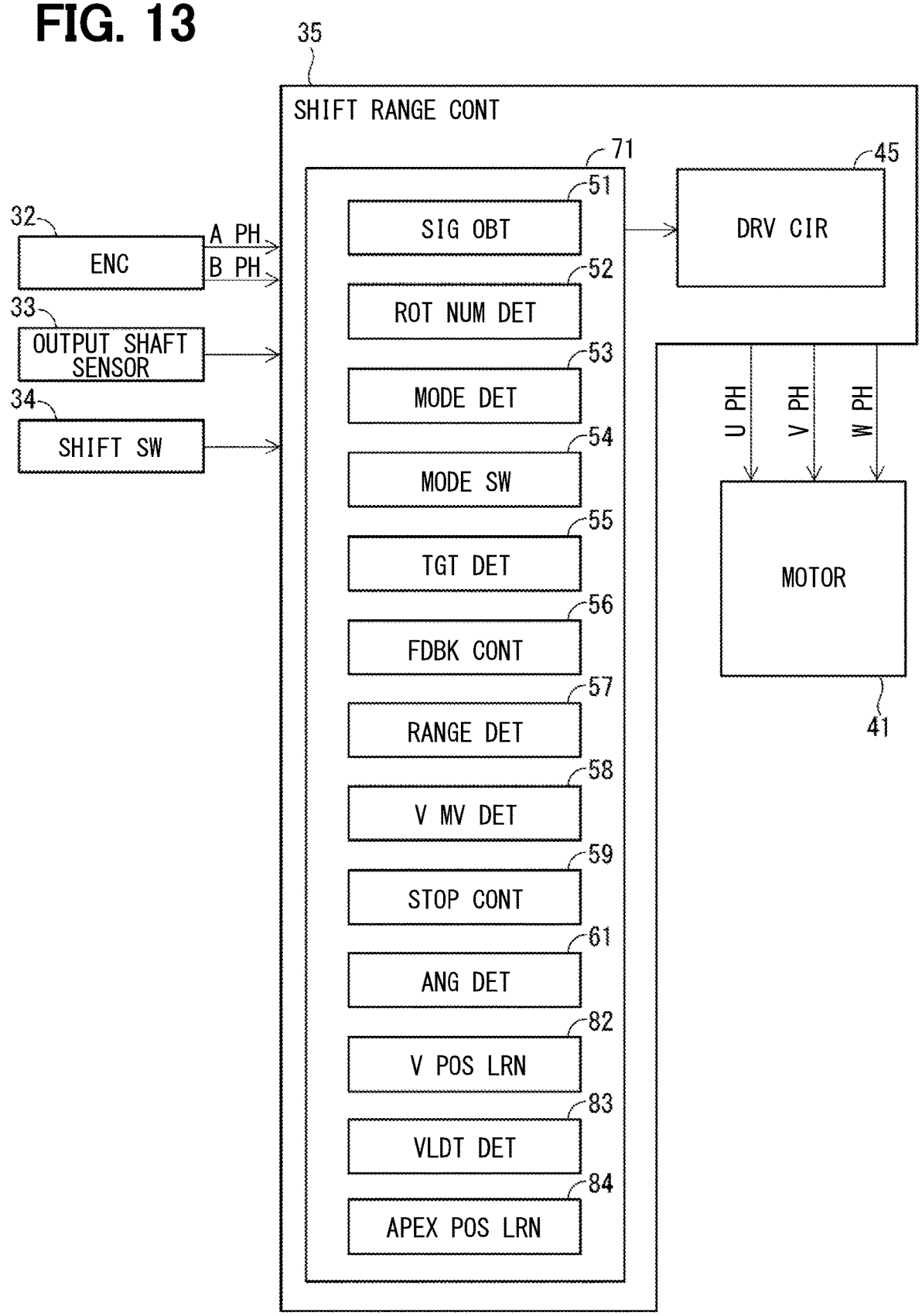
FIG. 13 is a diagram illustrating functional units included in the ECU of the shift range control device of a third embodiment.

In the third embodiment, as shown in FIG. 13, a valley position learner 82 of an ECU 81 learns part of the valley positions among all the recesses 21 to 24. The "part of" mentioned above means, for example, the recess 22. The specific valley position learned by the valley position learner 82 is the R valley position.

Figure 14:
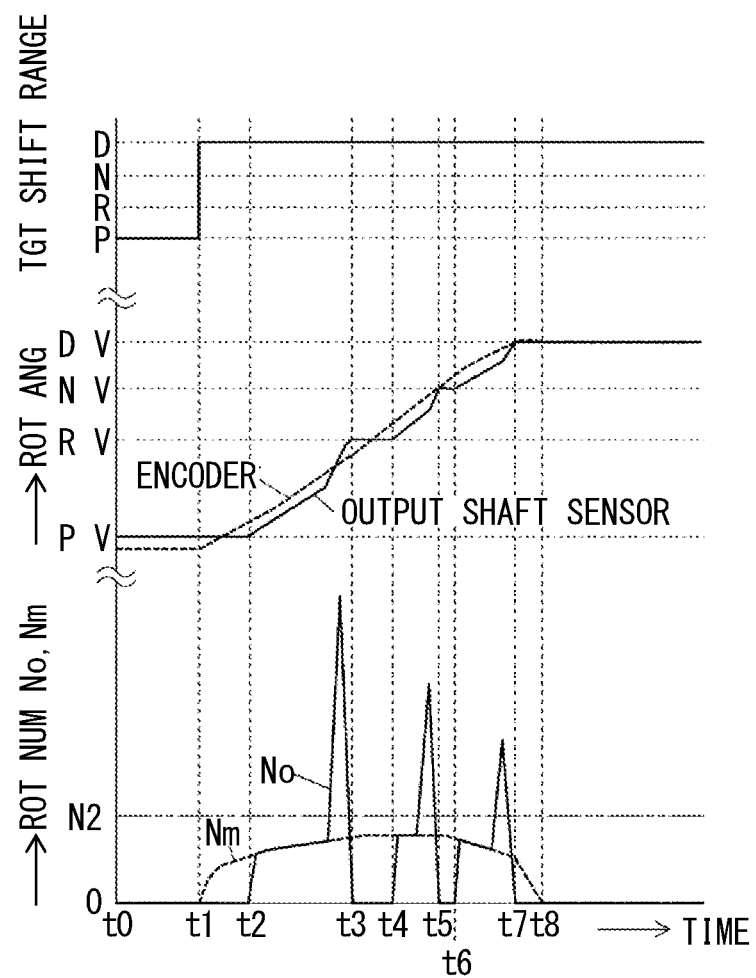
FIG. 14 is a time chart showing a transition of the rotation angle of the output shaft at a time of shift range switching by the ECU of FIG. 13, where a threshold value for determining that a locker has made a relative move to an apex is shown.

The ECU 81 includes an apex position learner 84. The apex position learner 84 learns, based on the detection value of the angle detector 61, the output shaft rotation angle θo when the locker 25 is positioned at an apex between the two recesses as an apex position. More specifically, when the output shaft rotation number No becomes equal to or greater than a predetermined value N2 (see FIG. 14) during the shift range switching, the apex position learner 84 determines that the locker 25 has made a relative move to an apex between two recesses, and learns an output shaft rotation angle θo at such time as an apex position. The predetermined value N2 is set to an output shaft rotation number that is not reached by a torque of the motor 41 by itself. In the third embodiment, the apex position learner 84 learns part of all the apex positions. The "part of" means, for example, an RP apex between the recess 21 and the recess 22. A specific apex position learned by the apex position learner 84 is the RP apex position.

A validity determiner 83 determines validity of the R valley positions that is part of the valley positions. More specifically, the validity determiner 83 affirmatively determines validity of the R valley position when a difference between the R valley position learned by the valley position learner 82 and the RP apex position learned by the apex position learner 84 is within a predetermined normal range from ΔθRRPL to ΔθRRPH centered on a difference between a design value of the rotation angle of the output shaft 43 when the locker 25 is positioned at the R valley bottom and a design value of the rotation angle of the output shaft 43 when the locker 25 is positioned at the RP apex. The valley position learner 82 completes the learning of the valley position when the validity determiner 83 determines that the R valley position is valid.

Figure 15:
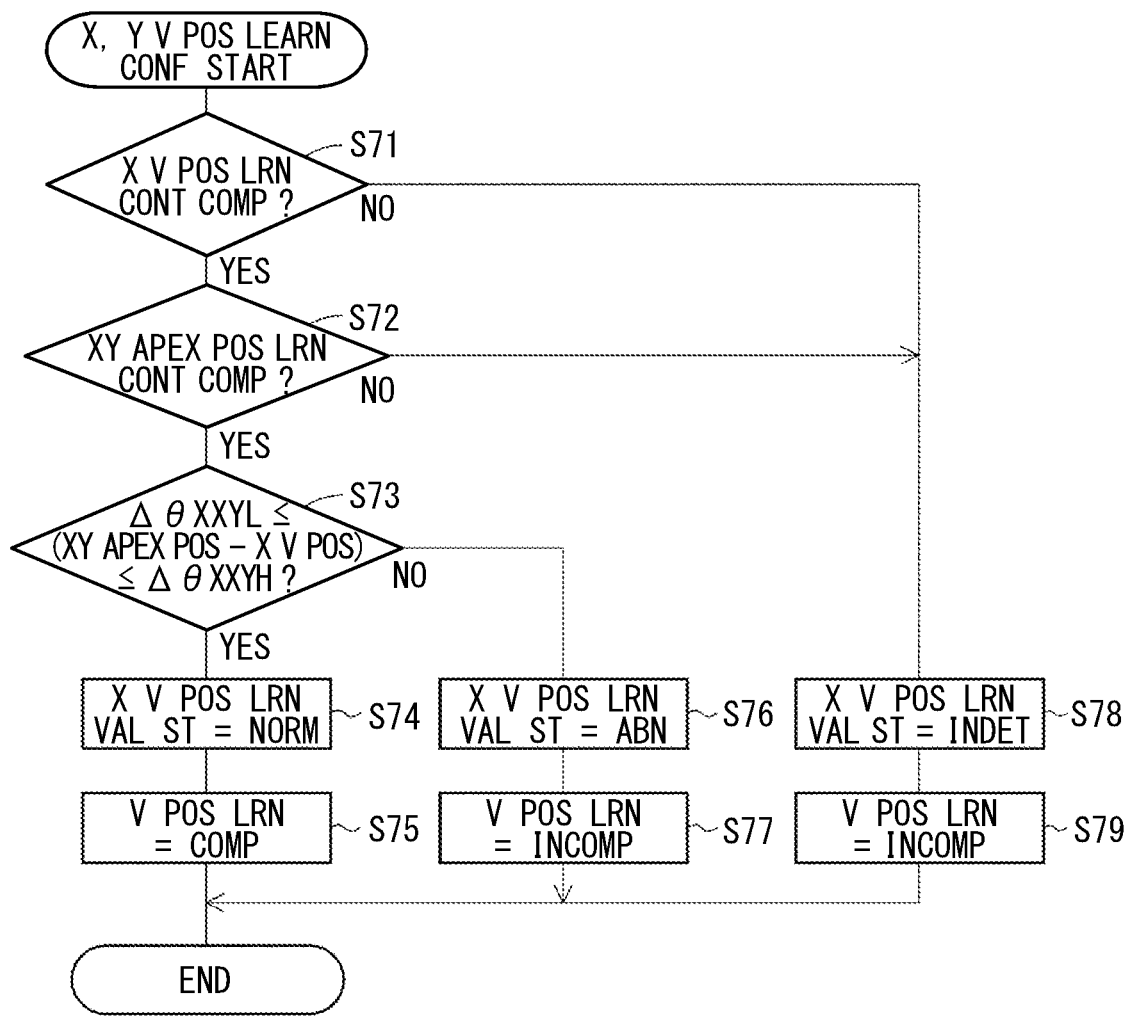
FIG. 15 is a flowchart illustrating a process performed by the ECU of FIG. 13.

A routine for confirming the valley position learning value shown in FIG. 15 is repeatedly performed after the startup of the ECU 81. In FIG. 15, "X" and "Y" are appropriately replaced with two of "P", "R", "N," or "D." In the following, an example of replacement in which "X" is replaced with "R" and "Y" is replaced with "P" is described.

When the routine of FIG. 15 is started, it is determined in S71 whether or not the R valley position learning control complete flag is on. When the R valley position learning control complete flag is on (S71: YES), the process proceeds to S72. When the R valley position learning control complete flag is off (S71: NO), the process proceeds to S78.

In S72, it is determined whether or not an RP apex position learning control complete flag is on. When the RP apex position learning control complete flag is on (S72: YES), the process proceeds to S73. When the RP apex position learning control complete flag is off (S72: NO), the process proceeds to S78.

In S73, it is determined whether or not "R valley position learning value–RP apex position learning value" is within the normal range from ΔθRRPL to ΔθRRPH. When it is within the normal range from ΔθRRPL to ΔθRRPH (S73: YES), the process proceeds to S74. When it is not within the normal range from ΔθRRPL to ΔθRRPH (S73: NO), the process proceeds to S76.

In S74, a status of the R valley position learning value is set to "normal." In S75 after S74, valley position learning is set to complete. After S75, the process exits from the routine of FIG. 15.

In S76, a status of the R valley position learning value is set to "abnormal." In S77 after S76, valley position learning is set to incomplete. After S77, the process exits from the routine of FIG. 15.

In S78, a status of the R valley position learning value is set to "indeterminable." In S79 after S78, valley position learning is set to incomplete. After S79, the process exits from the routine of FIG. 15.

<Effects>

As described above, in the third embodiment, the apex position learner 84 learns, based on the detection value of the angle detector 61, the output shaft rotation angle θo when the locker 25 is positioned at the apex between the two recesses as the apex position. The validity determiner 83 determines validity of the R valley position when a difference between the R valley position learned by the valley position learner 82 and the RP apex position learned by the apex position learner 84 is within a predetermined normal range from ΔθRRPL to ΔθRRPH centered on a difference between a design value of the rotation angle of the output shaft 43 when the locker 25 is positioned at the R valley bottom and a design value of the rotation angle of the output shaft 43 when the locker 25 is positioned at the RP apex. The normal range from ΔθRRPL to ΔθRRPH is not affected by an angle error in an assembly of the shift actuator 31 onto the automatic transmission 11. Therefore, since the normal range from ΔθRRPL to ΔθRRPH is smaller than the normal range of the first embodiment, validity of the valley position learning value can be determined with high accuracy. Therefore, the reliability of valley position learning can be further improved, and erroneous shift range switching and erroneous determination of the shift range can be further suppressed.

Further, in the third embodiment, validity of part of the valley positions is determined in the same manner as the second embodiment. Therefore, time required for the valley position learning is reducible.

Other Embodiments

In other embodiments, the valley move determiner may determine that the locker has made a relative move to a bottom of a recess when a difference between the motor rotation number and the output shaft rotation number is equal to or greater than a predetermined value in a rotation range where the output shaft rotation number is smaller than the motor rotation number during the shift range switching, based on the scale-matched rotation numbers of the motor and the output shaft by using the speed reduction rate.

In other embodiments, the valley move determiner may determine that the locker has made a relative move to the bottom of a recess when a predetermined time has elapsed after the output shaft rotation number has become equal to or greater than a predetermined value during the shift range switching. The predetermined value described above is set to an output shaft rotation number that is not reached by a torque of the motor by itself.

In the first embodiment, the valley position learner 62 learns valley positions for all the recesses 21 to 24, and the validity determiner 63 determines validity of all valley positions learned by the valley position learner 62. On the other hand, in other embodiments, the valley position learner may learn part of the valley positions, and the validity determiner may determine validity of part of the valley positions while determining validity of the valley position learning value by the same method as the first embodiment.

In the second and third embodiments, the valley position learner learns the valley positions for part of the recesses, and the validity determiner determines validity of part of the valley positions. On the other hand, in other embodiments, the valley position learner may learn all valley positions, and the validity determiner may determine validity of all valley positions while determining validity of the valley position learning value by the same method as the second embodiment or the third embodiment.

In other embodiments, the motor may be driven, i.e., rotated by not only a feedback control, but may also be driven by other methods, including, for example, an energization switching control in which energization phase of the motor is sequentially switched or the like.

In other embodiments, the detent plate may have two, three, five or more recesses. Accordingly, the number of the shift ranges switched by the shift range switching mechanism may be two, three, five or more.

In other embodiment, the learning of the valley position by the valley position learner is not only performed in the first operation in the assembly factory or the like, but may also be performed periodically thereafter. By performing the learning periodically, fine tuning/adjustment of the valley position is performable when the valley position changes over time. Further, the learning of the valley position by the valley position learner is not limited to the operation from one end to the other end of the range determination scope, but may also be performed for a partial operation, i.e., when the range switch operation is performed in a part of the range determination scope.

The control device and methods thereof described in the present disclosure may be realized by a special purpose computer which is configured by a computer program for performing one or more functions by using a processor and a memory. Alternatively, the control device and the method thereof described in the present disclosure may be realized by a special purpose computer configured as a processor with one or more dedicated hardware logic circuits. Alternatively, the control device and the method thereof described in the present disclosure may be realized by one or more dedicated computers, which is provided as a combination of (i) a processor with a memory for performing one or more functions and configured as a combination of a processor and (ii) a processor having one or more hardware logic circuits. The computer program may be stored, as instructions being performed by a computer, in a tangible, non-transitory computer-readable medium.

The present disclosure is not limited to the embodiments described above, but various modifications thereof may be encompassed as being within the scope of the present disclosure without departing from the spirit of the disclosure.

What is claimed is:

1. A shift range control device applied to a shift range switching mechanism, which includes (i) a rotating member that is rotatably connected to a shift actuator and has a plurality of recesses and (ii) a locking member including a locker that determines a rotation position of the rotating member by locking in the recesses, for controlling the shift actuator to switch a shift range, the shift range control device comprising:
    an angle detector detecting a rotation angle of an output shaft of the shift actuator;
    a valley position learner learning a valley position based on the rotation angle of the output shaft positioning the locker at a valley bottom of one of the recesses based on a detection value of the angle detector; and
    a validity determiner determining validity of a learning value learned by the valley position learner.

2. The shift range control device of claim 1, wherein
the valley position learner learns a plurality of valley positions, and
the validity determiner affirms validity of a specific pair of valley positions when a difference between one and another of the specific pair of valley positions learned by the valley position learner is within a predetermined normal range centered on a difference between a design value of the rotation angle of the output shaft when the locker is positioned at the valley bottom of the one of the specific pair of valley positions and a design value of the rotation angle of the output shaft when the locker is positioned at the valley bottom of the other of the specific pair of valley positions.

3. The shift range control device of claim 1 further comprising:
    an apex position learner learning an apex position based on the rotation angle of the output shaft positioning the locker at an apex between a pair of the recesses based on a detection value of the angle detector, wherein
    the validity determiner affirms validity of a specific valley position when a difference between the specific valley position learned by the valley position learner and a specific apex position learned by the apex position learner is within a predetermined normal range centered on a difference between a design value of the rotation angle of the output shaft when the locker is positioned at the valley bottom of the specific valley position and a design value of the rotation angle of the output shaft when the locker is positioned at the apex of the specific apex position.

4. The shift range control device of claim 1, wherein
the validity determiner (63) affirms validity of a specific valley position learned by the valley position learner, and
when the specific valley position learned by the valley position learner is within a predetermined normal range centered on a design value of the rotation angle of the output shaft positioning the locker at the valley bottom of the specific valley position.

5. The shift range control device of claim 1, wherein
the valley position learner learns the valley positions of all recesses, and
the validity determiner determines validity of part of the all valley positions learned by the valley position learner.

6. The shift range control device of claim 1, wherein
the valley position learner learns part of the valley positions of all recesses, and
the validity determiner determines validity of the part of the valley positions.

7. The shift range control device of claim 1, wherein
when the validity determiner determines that the valley position is not valid, the valley position learner does not complete the valley position learning and performs a notification of having an abnormal learning state.

* * * * *